Patented July 31, 1928.

1,678,659

UNITED STATES PATENT OFFICE.

BENJAMIN F. WALLACE, OF BROOKLYN, NEW YORK.

WATERPROOF HEAT INSULATION AND METHOD OF MAKING SAME.

No Drawing.    Application filed June 7, 1924. Serial No. 718,553.

This invention relates to improvements in the waterproofing of porous heat insulating materials of a fibrous nature, such for example as magnesia pipe covering, and has for its principal objects the effective and homogeneous impregnation of the insulating material treated with a relatively small quantity of a highly penetrative and relatively permanent waterproof agent without deleteriously affecting the heat insulating property of the absorbent insulating material treated.

Heretofore many attempts have been made to produce an insulated pipe covering which would withstand exposure to the elements and also which would be unaffected by leaks at the joints of the pipes protected thereby and elsewhere, but owing to the peculiar characteristics of such covering and particularly the relatively light weight thereof, it has been considered impracticable to efficiently and satisfactorily waterproof the same without virtually destroying the heat insulating properties thereof.

A preferred example of my new waterproof heat insulation embodying my invention and the method of making the same is as follows:

The usual mixture now commonly employed to make magnesia pipe coverings, consisting of magnesium carbonate and asbestos after being formed into the desired shapes, is submerged in a boiling solution of a suitable grease in a hydrocarbon, such for example as gasoline, containing about 2% to 4% of dégras grease in the proportions of about one part of the material to be treated to two parts of the dégras solution. The mixture is allowed to stand until the dégras mixture has thoroughly penetrated throughout the solid mass treated and the solvent evaporated either in vacuo or under atmospheric pressure.

After the removal of the solvent, the residual mixture is subjected to a prolonged heating operation, for example, for a period of 45 minutes at a temperature or sufficient to effectively waterproof the same as evidenced by test portions taken from time to time. When a test portion shows that the mass so tested will virtually float indefinitely on water, whereas the untreated mass will rapidly sink therein, the heating is discontinued and the product is ready, when cooled, to be packaged and shipped.

If desired, the magnesium carbonate or magnesium compound employed and asbestos in the form of a water pulp, can be mixed before molding with the dégras.

The mass is vigorously agitated to distribute the dégras throughout the same, after which it is formed and pressed into the desired shapes, the water removed and it is then subjected to the above described heat treatment.

Another method consists in first embodying the dégras with water and then mixing the emulsified liquid with dry asbestos and magnesium carbonate from a water pulp. The pulp is then molded into the desired shapes and the shapes are heated to evaporate the water and then the mass is subjected to the aforesaid heat treatment.

While I have particularly described my improved magnesium carbonate asbestos product, the same method is also applicable to heating insulating materials consisting of diatomaceous earth and asbestos fibre or the like porous silicious material mixed with asbestos fibre.

The importance of the heat treatment cannot be over-estimated since if the solvent is merely evaporated and the temperature is not elevated sufficiently high or for a sufficiently long period to render the material waterproof and water repellent, it will be found that the transformation accomplished by my improved process has not been effected.

In those cases where it is desired to produce a product which will not glow upon being heated, I have found by reducing the amount of dégras employed, this can be avoided.

In lieu of dégras I might also employ currier's hard grease, lanolin, or other products capable of successful substitution therefor, but preferably I employ dégras because of its remarkably effective results secured therewith and also because of its cheapness.

Preferably the temperature to which the residues are heated during the heat treatment herein referred to, range between 220° to 240° C., but in any event below the temperature at which the material will glow and yet above the temperature below which the desired result can be obtained.

Applicant is aware of Patent No. 1,228,485 describing the incorporation of an insoluble soap with an asbestos base and also the Patent No. 811,778 disclosing the uses of various greases with various other bases and accordingly, does not broadly claim the incorporation of any grease with an asbestos or like base, but intends to confine his invention to the combination set forth in the appended claims.

Having thus described my invention, what I claim is:

1. The herein described heating insulating materials comprising porous magnesium carbonate and fibrous asbestos impregnated with a highly penetrative waterproof grease, which insulating material is water repellent and will readily float on water.

2. The herein described heating insulating materials comprising porous magnesium carbonate and fibrous asbestos impregnated with a waterproof-dégras grease, which insulating material is water repellent and will readily float on water.

3. The method which consists in impregnating porous heating insulating materials with a highly penetrative waterproofing grease and then subjecting the same to an elevated temperature sufficient to effect the complete distribution of the grease throughout the mass so that a test portion of the mass so treated becomes water repellent and will readily float on water.

4. The method which consists in impregnating porous heating insulating material of a fibrous nature with a highly penetrative waterproof grease and then subjecting the mixture to a sufficient temperature to homogeneously distribute the grease throughout the mass without substantially filling the pores thereof, whereby a light bulky material is obtained which is water repellent and which will readily float on water, and the heating insulating properties of the original material remains substantially unaffected.

5. The herein described product comprising magnesium carbonate and fibrous asbestos containing degras grease homogeneously distributed throughout the structure thereof, said mass preserving its original porous condition and being sufficiently light to readily float on water.

6. The herein described heat insulating product including in its composition a light porous magnesium compound and fibrous material, said heat insulating product being impregnated with a highly penetrative grease which is so incorporated therewith, that the material, while water repellent, is both porous and sufficiently light to float readily on water for prolonged periods of time.

7. The method of making waterproof heat insulation which consists in effecting the intimate mixture of porous heat insulating material of a fibrous nature incorporated with sufficient water to form of a water pulp with a highly penetrative waterproof grease and then subjecting the mixture to a sufficient temperature to evaporate substantially all of the water and to homogeneously distribute the grease throughout the mass without substantially filling the pores thereof, whereby a light bulky material is obtained which is water repellent and which will readily float on water, and the heat-insulating properties of the original material remain substantially unaffected.

Signed at Ambler in the county of Montgomery and State of Pennsylvania this 5th day of June, 1924.

BENJAMIN F. WALLACE.